F. ROCHOW.
Sugar-Cutting Machine.
No. 164,486. Patented June 15, 1875.
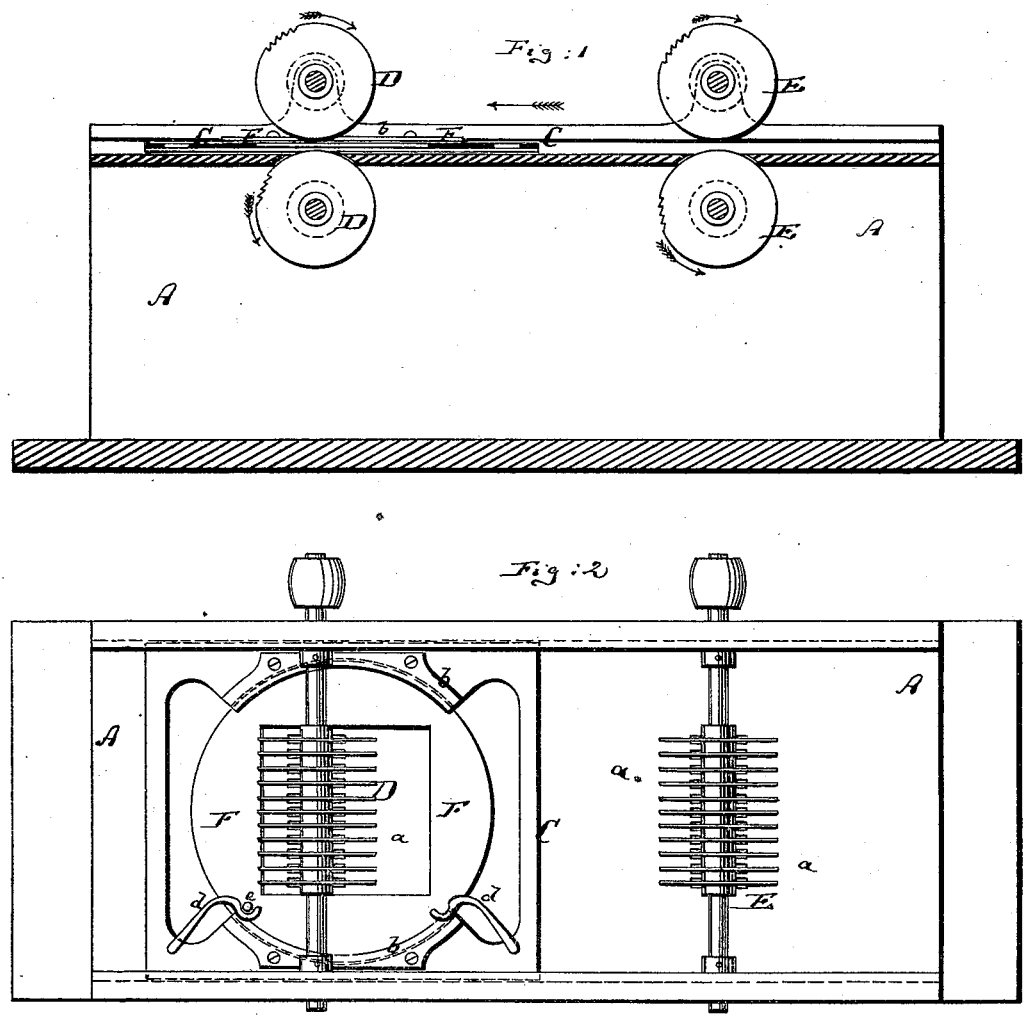

UNITED STATES PATENT OFFICE.

FERDINAND ROCHOW, OF BROOKLYN, NEW YORK.

IMPROVEMENT IN SUGAR-CUTTING MACHINES.

Specification forming part of Letters Patent No. 164,486, dated June 15, 1875; application filed May 26, 1875.

CASE B.

*To all whom it may concern:*

Be it known that I, FERDINAND ROCHOW, of Brooklyn, in the county of Kings and State of New York, have invented a new and Improved Machinery for Cutting Sugar Slabs into Blocks, of which the following is a specification:

Figure 1 is a vertical central section of my improved sugar-cutting machine; Fig. 2, a plan or top view of the same.

This invention relates to important modifications of the improved machine for cutting sugar slabs into blocks described in the application marked A, filed by me at the same time with this, and which consists principally in the combination of a perforated carrier with sugar-cutters, between which it passes.

The present invention has for its object to permit the use of circular saws entirely in connection with the perforated carrier, and also to provide means for using but one set of saws or cutters, instead of two sets.

The invention consists, first, in combining two double gangs of parallel saws, with one continuously-moving perforated carrier passing between them; secondly, in providing said perforated carrier with a turn-table or disk, all as and for the purpose hereinafter more fully described.

The letter A represents the frame of the machine. C is the perforated carrier-chain, or other suitable feed rack or plate, for feeding the sugar between two gangs of circular saws, D D, that are mounted on parallel shafts hung, respectively, above and below the table $a$ of the frame A, said table being slotted to allow the saws of the lower gang D to extend through it into the slab of sugar that is carried by the rack or carrier C. The rack is perforated to receive the slab of sugar, and to carry it between the saws over the table.

It will be readily understood that when the carrier takes a slab of sugar between the saws D D, such slab will thereby be cut into a series of parallel bars, and that if, for cutting the bars into cubes, another double gang of circular saws were employed at right angles with the first set, it would be necessary to arrest the motion of the carrier during the whole time occupied by the operation of the second double gang of saws. I have devised the use of a second double gang of saws, E E, which I place parallel to the first double gang D D, as shown in the drawing—the second double gang to cut the bars into cubes. And in order to make it possible to let the second double gang of saws cut at right angles to the first double gangs, I have introduced into the carrier, a turn-table or rotating disk, F, in which a hole for receiving the sugar slab is contained—that is to say, wherever the carrier has an aperture for receiving a slab of sugar, I insert in the carrier a circular plate, F, said plate having a hole of the size and shape of the slab to be held. This plate F is held in bearings $b$, and is made part of the carrier, in such a way that it can be revolved therein, and is locked in its two positions by suitable catches $d\ d$, fastened to the body of the carrier and engaging a pin, $e$, that projects from the said disk. After the carrier containing this disk has passed one slab of sugar between the saws D D, so that the slab is divided into bars, the disk F is turned either automatically or by hand, to bring the slab at right angles to its former position, and it then enters between the saws E E, so that the former bars of sugar can be cut into cubes by said saws E E. Thus it is that I utilize two pairs of gangs of parallel saws for cutting the slab in a continuously-moving carrier, C, first into bars and then into cubes. But by the invention of the turn-table F or disk, I am enabled to attain the same result by means of one pair of saws only, which I do by turning the disk F after it has once passed between the saws D D, and then moving the carrier back to carry the same slab of sugar between the same saws D D, but at right angles to its former position, so that the saws D D will first cut the sugar into bars, and then, on the return motion of the carrier, cut the bars into cubes. By the term "cut into bars and cubes" I mean, of course, the cutting of the slab to a sufficient depth to insure the production of such bars and cubes, the nature of the sugar being such that if it is creased by the saws to a certain depth, it will readily crack in the line of the crease to complete the desired separation of parts.

It is evident that the rotary turn-table F in the carrier may be used with equal advantage in connection with the clipping-tools shown in my application A, above referred to.

I claim as my invention—

1. In combination with the carrier C, which is perforated to receive a slab or slabs of sugar, and continuously moving in one direction, the two double gangs of saws D D and E E, all parallel to each other, substantially as described.

2. The carrier C, provided with a rotary disk, F, which is perforated to receive a slab of sugar, and turn the same after it has passed between a pair of cutting-tools, substantially as and for the purpose specified.

3. In combination with a double gang of circular saws, D D, a reciprocating carrier, C, containing the perforated turn-table F, substantially as herein shown and described.

4. The spring-catches $d\,d$, affixed to the carrier C, and combined with the projecting pin $e$ of the turn-table F, substantially as and for the purpose specified.

The above description of my invention signed by me this 25th day of May, 1875.

F. ROCHOW.

Witnesses:
  E. C. WEBB,
  F. V. BRIESEN.